United States Patent
Pate et al.

(10) Patent No.: US 6,226,979 B1
(45) Date of Patent: May 8, 2001

(54) PROPELLANT GRAIN CAPABLE OF GENERATING BUFFERED BOUNDARY LAYER FOR REDUCING ROCKET NOZZLE RECESSION

(75) Inventors: Robert A. Pate, Logan; Frederick M. Perkins, Brigham City, both of UT (US)

(73) Assignee: Cordant Technologies Inc., Salt Lake City, UT (US)

( * ) Notice: Subject to any disclaimer, the term of this patent is extended or adjusted under 35 U.S.C. 154(b) by 0 days.

(21) Appl. No.: 09/503,725

(22) Filed: Feb. 15, 2000

Related U.S. Application Data
(60) Provisional application No. 60/120,124, filed on Feb. 16, 1999.

(51) Int. Cl.⁷ ...................................................... F02K 9/28
(52) U.S. Cl. ........................... 60/253; 60/39.47; 102/291
(58) Field of Search .............................. 60/250, 253, 271, 60/39.47; 102/287, 289, 290, 291

(56) References Cited

U.S. PATENT DOCUMENTS

| | | |
|---|---|---|
| 2,706,887 | 4/1955 | Grow . |
| 3,052,092 * | 9/1962 | Kirkbride ................................ 60/250 |
| 3,091,924 | 6/1963 | Wilder, Jr. . |
| 3,092,963 | 6/1963 | Lawrence . |
| 3,253,405 | 5/1966 | Kropa . |
| 3,353,359 | 11/1967 | Webb . |
| 3,521,452 * | 7/1970 | Longwell ............................... 60/253 |
| 3,572,039 * | 3/1971 | Osburn .................................. 60/250 |
| 3,668,872 * | 6/1972 | Camp et al. ............................ 60/253 |
| 4,133,173 | 1/1979 | Schadow . |
| 4,574,700 | 3/1986 | Lewis . |
| 4,882,904 | 11/1989 | Schoenman . |

FOREIGN PATENT DOCUMENTS

| | | |
|---|---|---|
| 0015216 A1 | 9/1980 | (EP) . |

OTHER PUBLICATIONS

Kenneth Kuan–yun Kuo, "Principles of Combustion", pp. 704–713.
McDonald, et al., "Erosion of Graphite in Solid–Propellant Combustion Gases and Effects on Heat Transfer", pp. 1250–1257.
K. Klager, "The Interaction of the Efflux of Solid Propellants with Nozzle Materials", Propellants and Explosives 2, pp. 55–63 (1977).

* cited by examiner

Primary Examiner—Michael Koczo

(57) ABSTRACT

This rocket motor propellant grain is designed to reduce recession of at least the converging portion of a converging/diverging rocket motor nozzle. The propellant grain has an oxidizer-deficient grain portion constructed and arranged in relation to the nozzle to create, upon ignition of the propellant, a boundary layer of oxygen-deficient combustion products that flows through the nozzle throat passage and over an internal surface region of the nozzle. The boundary layer functions to at least substantially isolate the internal surface region of the nozzle from oxidizers contained in the combustion products generated from portions of the propellant grain having higher concentrations of oxygen than the oxidizer-deficient grain portion. As a result, the oxygen-rich portions of the propellant are unable to react with and thereby cause recession of the nozzle internal surface.

21 Claims, 2 Drawing Sheets

PROPELLANT GRAIN CAPABLE OF GENERATING BUFFERED BOUNDARY LAYER FOR REDUCING ROCKET NOZZLE RECESSION

RELATED APPLICATIONS

Priority is claimed of provisional application 60/120,124 filed in the U.S. Patent & Trademark Office on Feb. 16, 1999, the complete disclosure of which is incorporated herein by reference.

BACKGROUND OF THE INVENTION

1. Field of the Invention

This invention relates to a solid propellant grain suited for use in solid rocket motor assemblies and designed to reduce nozzle and insulation recession, especially for rocket motor assemblies comprising nozzle assemblies lined or made from carbon-based insulation material. This invention further relates to a solid rocket motor assembly containing the solid propellant grain.

2. Description of the Related Art

Conventionally, solid propellants of rocket motors contain, among other constituents, oxidizer and fuel components immobilized within a solid polymeric binder. The solid propellant is cast as a grain within a rigid outer case or shell of the rocket motor combustion chamber. A heat insulating layer and optionally a liner are usually interposed between the solid propellant grain and the outer case to protect the outer case from the high operating temperatures associated with rocket motor operation and to provide enhanced grain-to-case bonding.

The solid propellant grain is most commonly configured as either a center-perforated grain or an end burner grain. Generally, a center-perforated solid propellant grain includes a central perforation extending along a substantial portion of the length, if not the entire length, of the solid propellant grain and concentrically aligned with the longitudinal axis of the grain. As referred to herein, the cross section of the center perforation can have a relatively simple configuration, such as circular or oval; alternatively, the cross section can have a more complex geometry (star shaped, and/or with fins or slots) in order to increase exposed propellant surface area. The configuration of the center perforation geometry is usually tailored to provide a surface area corresponding to the desired rocket motor ballistic performance. Preferably, the centrally perforated propellant grain is ignited uniformly over its entire length, so that combustion reactions ensue simultaneously over the entire inner surface region. Oxidizing agents embedded within the solid-propellant grain drive these reactions to form large quantities of combustion products, which are expelled from the rocket motor through a nozzle in fluid communication with the combustion chamber. As the expelled combustion products thrust the rocket forward at high velocities, the combustion reactions continue to propagate outward radially to maintain the combustion of the propellant grain and expel combustion products through the nozzle.

An end burner solid-propellant grain functions in a similar manner to a center perforated grain, except that instead of a center perforation being present, the end burner solid-propellant grain is ignited at its aft end. The combustion reaction begins at the aft end and propagates along the length of the grain until reaching the forward end of the grain, at which point the grain stock is depleted. It is also known to use combinations of end burner and center perforated grains, in which the combustion reaction simultaneously occurs at both the aft end and center perforation of the propellant.

The amount of thrust produced by a rocket motor is proportional to the exit gas velocity squared. Nozzles are designed to accelerate the combustion product gases from the propellant grain to the maximum velocity at the exit. To achieve this end, nozzles usually have forward walls converging to a throat region and have aft walls diverging from the throat region to a larger exit area to form a converging-diverging nozzle configuration. The nature of compressible gases is such that a converging-diverging nozzle will increase the exit gas velocity and thereby thrust. It is within the purview of those skilled in the art to design a nozzle throat to optimize the ratio of exit area to throat area. Recession of the nozzle throat, however, decreases the thrust of an optimally designed nozzle.

As described above, an insulating layer and liner are typically placed between the propellant and the outer casing of the combustion chamber to protect the outer casing from the extremely high temperatures at which the rocket motor operates. Likewise, the nozzle must also be designed to withstand not only the elevated temperatures of the combustion products, but also the high velocities at which the combustion products pass over the nozzle inner surface.

Metal and metal alloys have been investigated for use as nozzle materials. One such heat resistant metallic material is silver-infiltrated tungsten. These materials provide generally satisfactory performance for large boosters. However, the weight penalty and expense associated with the presence of the tungsten and other suitable metals make such metal alloys impractical and uneconomical for many applications.

Carbon-based materials, such as carbon-carbon (C/C) composites and other graphitic materials, represent an excellent alternative to metals due to their high heat resistance, inexpensive cost, and relatively low weight.

It is widely acknowledged in the industry, however, that carbon-based nozzle throats tend to recede, especially at high operating temperatures and pressures. Several studies have identified oxidation reactions between the carbon-based nozzle material and oxygen-containing constituents of the combustion products as the dominant source of nozzle recession. As the propellant in the rocket motor burns, the carbon-based nozzle is exposed to the hot combustion gases, such as $O_2$, $H_2O$, $CO_2$, and NO. These gases, especially water and carbon dioxide, tend to react with the carbon-based nozzle materials to produce carbon monoxide gas, which is carried off with the discharged combustion products. As a consequence of the chemical consumption of the carbon-based nozzle materials, the nozzle throat recedes so that the nozzle throat passage area, which due to its narrow passage attributes to an increased velocity of combustion products, is undesirably increased.

The recession of the nozzle throat inner surface during motor operation is a source of several problems in rocket operation. One such problem is the performance loss encountered by the recession of carbon-based nozzle materials. As the nozzle throat material recedes, the accessible throat area for the combustion products to flow through increases, causing a corresponding decrease in output force. Additionally, rough nozzle surfaces, which tend to form during nozzle recession, have been shown to undergo recession at a faster rate than smooth surfaces. Thus, the nozzle throat recession process can be characterized as a self-perpetuating phenomenon. Another problem attributable to nozzle recession is a loss of predictability. Calculations for determining acceptable payloads and requisite propellant grain stocks must be accurate to ensure that the rocket will reach its intended target. The calculations necessary for ascertaining rocket dimensions and payloads are dependent upon many variables, including nozzle throat dimension. In-flight variations of nozzle throat dimension due to recession can significantly complicate, if not render impossible, precise motor performance calculations.

It would, therefore, be a significant improvement in the art to provide a rocket motor assembly that advantageously comprises an oxidizable nozzle material and/or insulation, such as carbon/carbon composite nozzle, yet in operation is capable of avoiding significant nozzle erosion, even when the operating conditions are characterized by high temperatures and pressures.

SUMMARY OF THE INVENTION

It is, therefore, an object of this invention to provide a rocket motor assembly that avoids the problems outlined above and accomplishes the above-mentioned improvement in the art.

In furtherance of these objects, the inventors discovered a way of lowering the concentration of oxidizer within the combustion products flowing over the inner surface of the carbon-based nozzle without significantly reducing the overall oxidizer content of the entire propellant grain.

In accordance with an embodiment of this invention, the rocket motor assembly comprises an outer casing structure comprising a combustion chamber, a nozzle structure with a converging-diverging portion defining a throat portion of minimum cross-sectional area and comprising one or more oxidizable insulation materials, and a combustible solid-propellant grain comprising a combustible oxidizer-deficient grain portion separated from the nozzle throat passage. As referred to herein, "separated from the nozzle throat passage" means that the grain portion does not form the internal surface of the nozzle throat portion. Preferably, the grain portion does not form part of the converging portion of the nozzle throat, especially for vectored nozzles.

Upon ignition of a solid-propellant grain, propellant grain is combusted and expelled through the nozzle structure as combustion products. The inventors found that for center-perforated solid-propellant grains, the aft portion of the solid-propellant grain is responsible for generating a substantial portion of a boundary layer of the combustion products that flows directly over the inner surface of the nozzle. The inventors also found that for end burning grains, the circumferential portion of the grain is primarily responsible for generating the boundary layer. In accordance with embodiments of this invention, this aft portion and/or circumferential portion of the propellant grain is/are deficient in oxidizer content relative to the remainder of the solid propellant grain as a whole. The oxidizer-deficient aft grain portion is constructed and is arranged sufficiently close to the nozzle structure to generate, upon ignition of the grain, a boundary layer of oxidizer-deficient combustion products that flows over the nozzle structure inner surface and thereby substantially isolates the nozzle structure internal surface from oxidizers contained in combustion products formed from other portions of the solid propellant grain having higher oxidizer concentrations than the oxidizer-deficient portion. By substantially isolating the inner surface of the nozzle structure from oxidizing agents, recession of the converging portion and the throat portion, and preferably the diverging portion as well, is significantly reduced compared to had the oxidizer-deficient portion not been present.

The present invention can be applied to center-perforated propellant grains having an exposed longitudinally extending inner surface region in which, upon ignition of the grain at the inner surface region, combustion reactions propagate outward radially from the inner surface region to produce combustion products. The inventive concept of an oxidizer-deficient grain portion can also be applied to combustible end burning solid-propellant grain having an exposed aft end surface region in which, upon ignition of the grain at the exposed aft end surface region, combustion reactions propagate forward longitudinally from the exposed aft end surface region to produce combustion products. The present invention is still further applicable to solid-propellant grains constructed and arranged to burn simultaneously from a center perforation and exposed aft end.

Without intending to limit the scope of this invention, the inventors believe that the invention can be applied to most rocket motors having a solid-propellant grain and utilizing carbon-based nozzle and insulation materials that are prone to chemical attack. The invention may be used for reusable solid rocket motors and disposable solid rocket motors. As referred to herein, rocket motors include tactical missiles. This invention is also applicable to nozzle structures formed from any type of material that is prone to chemical attack by oxidizing agents of the propellant grain.

It is another object of this invention to provide unguided rocket assemblies and guided missile assemblies (collectively referred to herein as rocket assemblies) comprising the foregoing rocket motor assembly, and further comprising a forward assembly, such as an aerodynamic structure, projectile, warhead or payload assembly.

These and other objects, features, and advantages of the present invention will become apparent from the following detailed description when taken in conjunction with the accompanying drawings, which illustrate, by way of example, the principles of the present invention.

BRIEF DESCRIPTION OF THE DRAWINGS

The accompanying drawings facilitate an understanding of the principles of this invention. In such drawings.

DETAILED DESCRIPTION OF THE INVENTION

Figure 1:
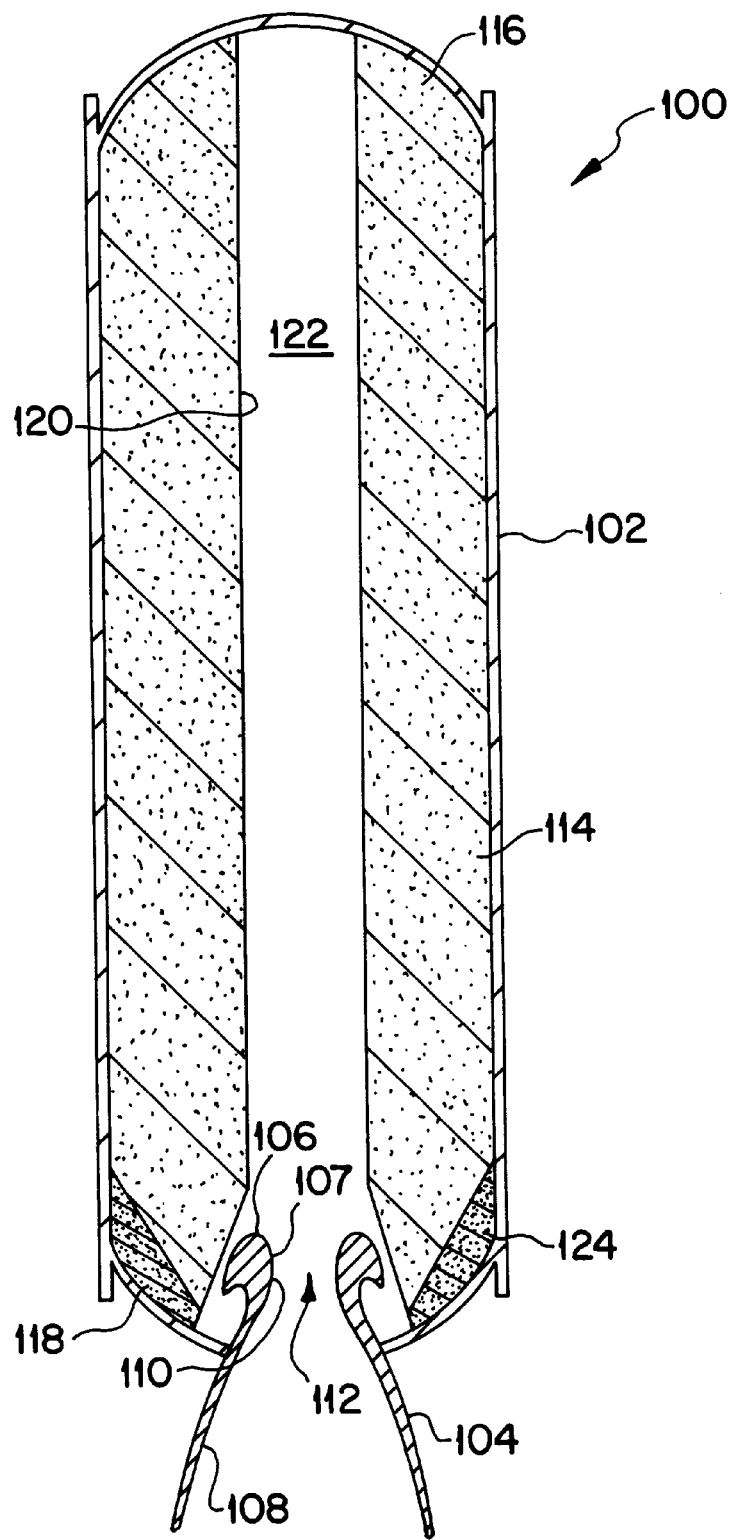
FIG. 1 is a schematic sectional view of a rocket assembly comprising a center-perforated solid-propellant grain in accordance with an embodiment of this invention.

A rocket motor assembly in accordance with a first embodiment of this invention is depicted in FIG. 1 and generally designated by reference numeral 100. The rocket motor assembly 100 includes an outer casing structure 102 comprising a combustion chamber (unnumbered). Positioned aft of the casing structure 102 is a nozzle structure 104 having a converging nozzle portion 106 that converges into a minimum cross-sectional area throat portion 107 (or throat), and a diverging portion 108 extending awkwardly from the throat portion 107 so that the converging and diverging portions 106 and the throat portion 107 collectively define an internal surface region 110 made of one or more oxidizable insulation materials. The internal surface region 110 defines a throat passage 112 in fluid communication with the combustion chamber to receive combustion products from the combustion chamber and expel the combustion products through the diverging exit portion 108.

Loaded within the casing structure 102 is a combustible solid-propellant grain 114 extending in length from a forward end 116 to an aft end 118. The solid-propellant grain 114 has an exposed inner surface 120 extending along at least a substantial portion of the length of the grain 114 to define a center perforation 122. In operation, the grain 114 is ignited at the exposed inner surface 120 to initiate combustion reactions. Optionally, if the aft end 118 is exposed (not shown in FIG. 1), the aft end 118 may also be ignited to burn simultaneously with the inner surface 120. The combustion reactions initiated at the exposed inner surface 120 propagate radially outward towards the casing structure 102. A liner (not shown) can be placed between the solid-propellant grain 114 and the casing structure 102 to protect the casing structure 102. Optionally, if the aft end 118 is exposed and also ignited, the combustion reactions propagate longitudinally forward from the aft end 118. Combustion products created by these reactions flow through the throat passage 112 and are expelled through the diverging passage portion 108.

Formed at the aft end 118 of the propellant grain 114 is an oxidizer-deficient portion 124. The oxidizer-deficient portion 124 may be formed integral with or separate from the remainder of the propellant grain 114. The oxidizer-deficient portion 124 is constructed and arranged sufficiently close to the nozzle structure 104 to create, upon ignition of the grain 114 (including portion 124) at the inner surface 120, a boundary layer of oxygen-deficient combustion products (not shown) flowing through the nozzle throat passage 112 and over the internal surface region 110 so that the boundary layer at least substantially isolates the internal surface region 110, at least at the converging portion 106 and the nozzle portion 107, and preferably also at the diverging portion 108, from oxidizing agents contained in the combustion products generated from portions of the grain 114 having higher concentrations than the oxygen-deficient portion 124. In this manner, the boundary layer significantly reduces recession of the converging portion 106 and nozzle portion 107, and preferably also the diverging portion 108, caused by oxidation reactions.

A second embodiment of the invention will now be described with reference to FIG. 2. In order to facilitate an understanding of the structure and operation of the second embodiment, and in the interest of brevity, the structural elements of the embodiments of FIG. 2 corresponding in structure or function with elements of the embodiment of FIG. 1 have been designated by the same reference numerals used in FIG. 1, except for the substitution of the prefix numeral 2 for 1.

Figure 2:
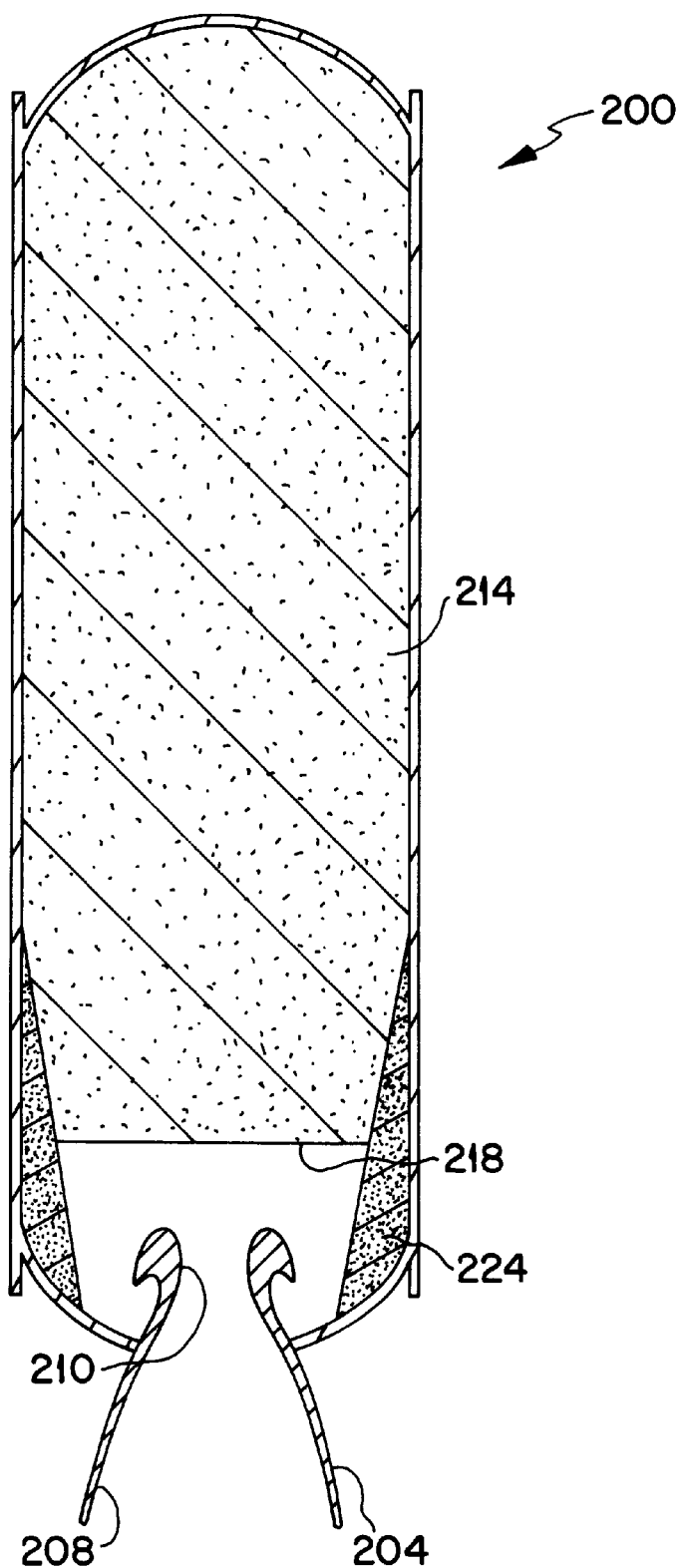
FIG. 2 is a schematic sectional view of a rocket assembly comprising an end burner solid-propellant grain in accordance with another embodiment of this invention.

FIG. 2 depicts a rocket motor assembly 200 comprising an end burning solid-propellant grain 214. Unlike the grain of the first embodiment, the solid-propellant grain 214 of the second embodiment does not have a center perforation. Instead, the combustion reaction is initiated only at an exposed aft end portion 218. The combustion reaction advances forward from the aft end portion 218, rather than radially outward as in the first embodiment.

The inventors found that for an end burning solid-propellant grain 214, the circumferential portion of the propellant grain 214 is primarily responsible for producing a substantial portion of the boundary layer of combustion products flowing directly over the nozzle structure internal surface region 210. Accordingly, the oxidizer-deficient portion 224 is located near the outer circumference of the grain 214. Because the oxidizer-deficient portion 224 burns slower than the remainder of the grain 214 due to its low oxygen concentration, the oxidizer-deficient portion does not extend along the entire length of the circumferential portion of the grain 214, i.e., to the forward end 216 of the grain 214.

In the illustrated embodiment, the oxidizer-deficient grain portion 224 extends aft of the exposed aft end portion 218 and tapers along a longitudinal forward direction. The positioning of the oxidizer-deficient portion 224 in proximity to the nozzle structure 204 is preferable, since the boundary layer of oxidizer-deficient combustion products is formed closer to the nozzle structure 204 and is less likely to intermix with higher oxidizer content combustion products prior to being expelled from the exit portion 208.

The amount of oxidizer that may be present within the oxidizer-deficient portion is dependent upon many factors, including the amount of nozzle recession that is acceptable for a given application and the particular oxidizer selected. Demands for decreased nozzle recession must be balanced against the need to have sufficient oxidizer present to drive combustion. This invention is not limited to a specific oxidizer concentration, other than to require that the oxidizer-deficient grain portion have a detectably lower oxidizer concentration than the remainder of the grain as a whole to protect the converging nozzle portion and throat portion from recession. Generally, the amount of oxidizer in the oxidizer deficient portion is less than the stoichiometric amount required for the combustion reaction. As referred to herein, oxidizer shall mean oxygen or an oxygen-containing compound entrained in the exhaust flow passing over the nozzle structure inner surface and capable of, during rocket motor operation, oxidative reaction with a carbon-based nozzle material to form carbon monoxide and various other compounds, such as molecular hydrogen and/or one or more of various hydrocarbons. Representative oxidizers include, by way of example, as ammonium perchlorate and ammonium nitrate. The oxidizer may be used in the form of particles. It is particularly advantageous to use a grain containing an oxidizer comprising particles in at least two different particle distributions, e.g., at least bi-modal, such as larger particles of about 200 $\mu$m or 400 $\mu$m and smaller particles of about 50 $\mu$m.

The required thickness of the oxidizer-deficient portion is similarly dependent upon many factors, including the amount of nozzle recession that is acceptable for a given application. Determinations of suitable dimensions for the oxidizer-deficient portion can be made with the assistance of computational fluid dynamics, which assist in predicting fluid flow, such as the flow of the boundary layer. A discussion of computational fluid dynamics can be found in Computational Fluid Dynamics, The Basics and Applications, John D. Anderson, Jr. (McGraw Hill 1995). Generally, the thickness of the oxidizer-deficient portion for forming the protective boundary layer will range from less than 0.10 inch (0.25 cm) for small motors to more than 1.0 inch (2.54 cm) for large motors. If properly positioned, the oxidizer-deficient portion of the propellant constitutes no more than approximately 1 to 2 percent of the propellant grain to form a suitable protective boundary layer.

It is understood that the composition of the propellant grain is not particularly limited by the scope of this invention, except insofar as the concentration of the oxidizer in the oxidizer-deficient portion of the propellant grain. By way of example, the propellant grain may be made from hydroxy-terminated polybutadiene (HTPB), polytetrahydrofuran (PTHF), or polyalkylene oxide, but the invention is not limited to these specific polymer binders. For example, carboxy-terminated polybutadiene may be used, as may various polyethers, liquid rubbers, acrylates, polystyrenes, silicones, polyolefins, and the like, as well as double-based binders.

Fuel additives, such as powdered metals or powdered metalloids, including aluminum, magnesium, zinc, boron, and others, may be used. Various plasticizers and other additives may be used. Suitable plasticizers generally depend on the selected binder and desired application, but may include, without limitation, triethyleneglycol dinitrate (TEGDN), n-butyl-2-nitratoethyl-nitramine (BuNENA, dioctyladipate (DOA), isodecylperlargonate (IDP), dioctylphthalate (DOP), dioctylmaleate (DOM), dibutylphthalate (DBP), oleyl nitrile, to name a few.

Combustion acoustic stabilizers such as zirconium carbide, carbon, and alumina may be present, as may ballistic modifiers such as $TiO_2$, $ZrO_2$, $Al_2O_3$, $SiO_2$, and $Fe_2O_3$. Other optional additives include, without limitation, fillers, catalysts, and the like may be contained in the grain.

The foregoing detailed description of the embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in the art and are encompassed within the spirit and scope of the appended claims.

We claim:

1. A rocket motor assembly comprising:
   an outer casing structure comprising a combustion chamber;
   a nozzle structure having a converging portion that converges into a minimum cross-sectional area throat portion, and a diverging exit portion positioned aft of said converging and throat portions to collectively define an internal surface region, said internal surface region of said converging portion and said throat portion comprising one or more oxidizable insulation materials and providing a nozzle throat passage in fluid communication with said combustion chamber to receive combustion products from said combustion chamber and expel the combustion products through said exit region; and
   a combustible solid-propellant grain extending in length from a forward end to an aft end thereof and housed within said outer casing structure, said propellant grain having an exposed inner surface extending along at least a substantial portion of the length of said grain to define a center perforation, said solid propellant grain including a combustible oxidizer-deficient grain portion separated from said throat portion,
   wherein said grain is constructed and arranged so that, upon ignition of said grain at said exposed inner surface, combustion reactions propagate radially outward from said inner surface to produce and expel the combustion products through said nozzle throat passage, and
   wherein said oxidizer-deficient grain portion is constructed and is arranged sufficiently close to said nozzle structure to create, upon ignition of said grain at said inner surface region, a boundary layer of oxygen-deficient combustion products that flows through said nozzle throat passage and over said internal surface region to at least substantially isolate said internal surface region of at least said converging portion and said throat portion from oxidizers contained in the combustion products generated from parts of said grain having higher concentrations of oxygen than said oxidizer-deficient grain portion, thereby reducing recession of at least said converging portion and said throat portion.

2. A rocket motor assembly according to claim 1, said one or more chemically oxidizable insulation materials being carbon-based.

3. A rocket motor assembly according to claim 2, wherein said carbon-based insulation material comprises a carbon/carbon layer.

4. A rocket motor assembly according to claim 1, wherein said oxidizer-deficient grain portion is present in said grain in a concentration in a range of from about 1% by weight to about 2% by weight.

5. A rocket motor assembly according to claim 1, wherein said oxidizer-deficient grain portion defines said aft end of said grain.

6. A rocket motor assembly according to claim 1, wherein said combustible oxidizer-deficient grain portion is separated from said throat portion and said converging portion.

7. A rocket motor assembly according to claim 1, wherein said boundary layer isolates said internal surface region of at least said converging portion, said throat portion, and said diverging portion from oxidizers contained in the combustion products generated from parts of said grain having higher concentrations of oxygen than said oxidizer-deficient grain portion, thereby reducing recession of at least said converging portion, said throat portion, and said diverging portion.

8. A rocket motor assembly comprising:
   an outer casing structure comprising a combustion chamber;
   a nozzle structure having a converging portion that converges into a minimum cross-sectional area throat portion, and a diverging exit portion positioned aft of said converging portion to collectively define an internal surface region, said internal surface region of said converging portion being comprised of one or more oxidizable insulation materials and providing a nozzle throat passage in fluid communication with said combustion chamber to receive combustion products from said combustion chamber and expel the combustion products through said exit region; and
   a combustible end burning solid-propellant grain extending in length from a forward end to an aft end thereof and housed within said outer casing structure, said propellant grain having an exposed aft end surface region and including a circumferentially positioned, combustible oxidizer-deficient grain portion separated from said throat portion,
   wherein said grain is constructed and arranged so that, upon ignition of said grain at said exposed aft end surface region, combustion reactions propagate forward longitudinally from said exposed aft end surface region to produce and expel the combustion products through said nozzle throat passage, and
   wherein said oxidizer-deficient grain portion is constructed and is arranged sufficiently close to said nozzle structure to create, upon ignition of said grain at said exposed aft end surface region, a boundary layer of oxygen-deficient combustion products that flows through said nozzle throat passage and over said internal surface region to at least substantially isolate said internal surface region of at least said converging portion and said throat portion from oxidizers contained in the combustion products formed from portions of said grain having higher concentrations of oxygen than said oxidizer-deficient grain portion, thereby reducing recession of at least said converging portion and said throat portion.

9. A rocket motor assembly according to claim 8, said one or more chemically oxidizable insulation materials being carbon-based.

10. A rocket motor assembly according to claim 9, wherein said carbon-based insulation material comprises a carbon/carbon layer.

11. A rocket motor assembly according to claim 8, wherein said oxidizer-deficient grain portion is present in said grain in a concentration in a range of from about 1% by weight to about 2% by weight.

12. A rocket motor assembly according to claim 8, wherein said oxidizer-deficient grain portion extends aft of said exposed aft end surface region.

13. A rocket motor assembly according to claim 8, wherein said oxidizer deficient portion tapers along a longitudinally forward direction.

14. A rocket motor assembly according to claim 8, wherein said combustible oxidizer-deficient grain portion is separated from said throat portion and said converging portion.

15. A rocket motor assembly according to claim 8, wherein said boundary layer isolates said internal surface region of at least said converging portion, said throat portion, and said diverging portion from oxidizers contained in the combustion products generated from parts of said grain having higher concentrations of oxygen than said oxidizer-deficient grain portion, thereby reducing recession of at least said converging portion, said throat portion, and said diverging portion.

16. A rocket motor assembly comprising:
an outer casing structure comprising a combustion chamber;
a nozzle structure having a converging portion that converges into a minimum cross-sectional area throat portion, and a diverging exit portion positioned aft of said converging portion to collectively define an internal surface region, said internal surface region of said converging portion and said throat portion comprising one or more oxidizable insulation materials and providing a nozzle throat passage in fluid communication with said combustion chamber to receive combustion products from said combustion chamber and expel the combustion products through said exit region; and
a combustible solid-propellant grain extending in length from a forward end to an exposed aft end thereof and housed within said outer casing structure, said propellant grain having an exposed inner surface extending along at least a substantial portion of the length of said grain to define a center perforation, said solid propellant grain including a combustible oxidizer-deficient grain portion separated from said throat portion,
wherein said grain is constructed and arranged so that, upon ignition of said grain at both said exposed inner surface and said aft end, combustion reactions propagate radially outward from said inner surface and forward from said exposed aft end to produce and expel the combustion products through said nozzle throat passage, and
wherein said oxidizer-deficient grain portion is constructed and is arranged sufficiently close to said nozzle structure to create, upon ignition of said grain at said inner surface region and said exposed aft end, a boundary layer of oxygen-deficient combustion products that flows through said nozzle throat passage and over said internal surface region so that said boundary layer at least substantially isolates said internal surface region of at least said converging portion and said nozzle portion from oxidizers contained in the combustion products generated from portions of said grain having higher concentrations of oxygen than said oxidizer-deficient grain portion, thereby reducing recession of at least said converging portion and said nozzle portion.

17. A rocket motor assembly according to claim 16, said one or more chemically oxidizable insulation materials being carbon-based.

18. A rocket motor assembly according to claim 17, wherein said carbon-based insulation material comprises a carbon/carbon layer.

19. A rocket motor assembly according to claim 16, wherein said oxidizer-deficient grain portion is present in said grain in a concentration in a range of from about 1% by weight to about 2% by weight.

20. A rocket motor assembly according to claim 16, wherein said combustible oxidizer-deficient grain portion is separated from said throat portion and said converging portion.

21. A rocket motor assembly according to claim 16, wherein said boundary layer isolates said internal surface region of at least said converging portion, said throat portion, and said diverging portion from oxidizers contained in the combustion products generated from parts of said grain having higher concentrations of oxygen than said oxidizer-deficient grain portion, thereby reducing recession of at least said converging portion, said throat portion, and said diverging portion.

\* \* \* \* \*